March 16, 1965

W. SCHNEIDER ETAL 3,174,060
TEMPERATURE COMPENSATING CIRCUIT EMPLOYING PLURALITY
OF SEMICONDUCTIVE DIODES CONNECTED IN SERIES

Filed April 23, 1962 2 Sheets-Sheet 1

INVENTORS
Wolfgang Schneider &
Adolf Kley
BY
George M. Spencer
ATTORNEY

INVENTORS
Wolfgang Schneider &
Adolf Kley

United States Patent Office 3,174,060
Patented Mar. 16, 1965

3,174,060
TEMPERATURE COMPENSATING CIRCUIT EMPLOYING PLURALITY OF SEMICONDUCTIVE DIODES CONNECTED IN SERIES
Wolfgang Schneider and Adolf Kley, Ulm (Danube), Germany, assignors to Telefunken Patentverwertung-G.m.b.H., Ulm (Danube), Germany
Filed Apr. 23, 1962, Ser. No. 189,482
Claims priority, application Germany, Apr. 26, 1961, T 20,059
5 Claims. (Cl. 307—88.5)

The present invention relates generally to circuits for use in analog computers, and, more particularly, to a circuit which is arranged to compensate for the temperature variations of semiconductor diode function generators.

In analog computers, function generators are used for forming a computer output voltage from a computer input voltage and which is a very accurately defined non-linear function of the input voltage. In order to accomplish this, the non-linear curve is approximated by the use of a broken line or multi-rectilinear curve, wherein the straight portions thereof are connected so as to generally approximate the curvilinear curve. Then, the straight rectilinear portions of the curve can be provided by adding several voltage and current characteristic curves having different curve break points and different slopes, so that a continuous multi-rectilinear curve is formed which closely approximates that of the desired curvilinear function.

In the prior art, some types of circuits which have been used, included diodes which were biased in the blocking direction. When operated in the forward direction, the diodes would provide the necessary voltage, and the desired curve is obtained by connecting several of these diode circuits together to add their voltages. Thus, at the output of the diode circuits some type of adding device is used having the multi-rectilinear characteristic provided at its output.

However, there are essential disadvantages in the use of such a process. When using semiconductor diodes, due to the temperature effect of their unblocking voltage or forward voltage which renders the barrier resistance zero, an unduly large amount of drifting of all the rectilinear curve break points of the multi-rectilinear curve is caused. Thus, it becomes doubtful that there will be a precise approximation of the desired curvilinear function because of the temperature variations which usually occur.

With these defects of the prior art in mind, it is a main object of this invention to provide a circuit which eliminates and/or compensates for the undesired changes in the outputs of function generators due to diode temperature effect.

Another object of the invention is to provide means for compensating for the temperature variation of semiconductor diode function generators which are simple and inexpensive in construction.

These objects and others ancillary thereto are accomplished according to preferred embodiments of the invention wherein the temperature compensating arrangement includes the use of compensation semiconductor diodes connected in the forward direction and in series with a resistor. The number of the diodes are dependent upon the resistance values of the series resistor and a resistor which is used for linearizing.

Additional objects and advantages of the present invention will become apparent upon consideration of the following description when taken in conjunction with the accompanying drawings in which.

Figure 1:
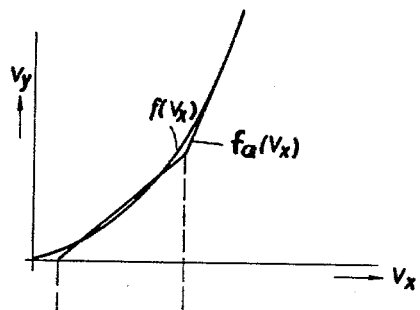
FIGURES 1 and 2 are graphical views illustrating the manner of approximating curvilinear functions by means of broken line curves.
Figure 2:
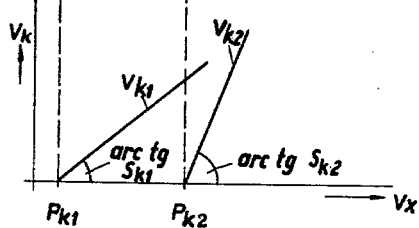
Figure 3:
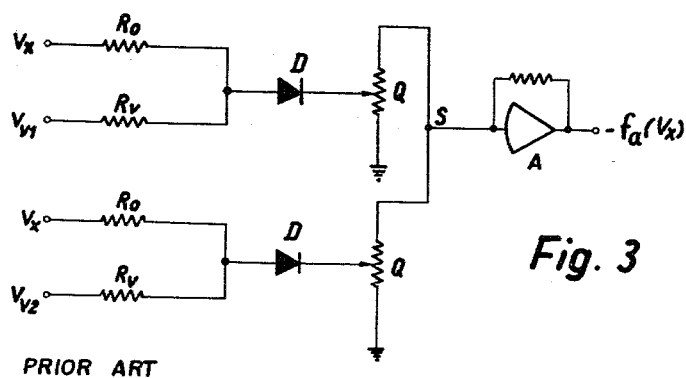
FIGURE 3 is a circuit diagram of a type of function generator used in the prior art.

With more particular reference now to the drawings, FIGURES 1 through 3 provide an indication of the known method of solving the problem of forming, from a computer input voltage, a computer output voltage which is a very accurately defined non-linear function of the input voltage, and which is used in analog computers. FIGURE 1 illustrates a desired curvilinear function plotted against computer input voltage and computer output voltage, with the function being $V_y=f(V_x)$, in which $V_y$ is the computer output voltage and $V_x$ is the computer input voltage. Further shown in FIGURE 1 is an approximation curve of function $f(V_x)$ by means of a multi-rectilinear curve approximation $f_a(V_x)$. The multi-rectilinear or broken line curve is provided by the addition of several voltage and current characteristics having different curve break points and different slopes. This is clearly indicated in FIGURE 2 which shows the voltage and current characteristics $V_{k1}$ and $V_{k2}$ with their curve break point positions $P_{k1}$ and $P_{k2}$ with their slopes $S_{k1}$ and $S_{k2}$.

FIGURE 3 illustrates a conventional type of circuit which is used for this purpose. The circuit illustrated provides an approximation of the function $f(V_x)$ by using two voltage and current characteristics $V_{k1}$ and $V_{k2}$. The circuit is constructed of two circuit sections of similar construction and each of which produces one of the voltage and current characteristics $V_{k1}$ and $V_{k2}$ by using diodes D which are reverse biased or biased in the blocking direction. The characteristic curves of the diodes D are rendered substantially linear by means of linearizing resistors $R_0$. At the same time, the input computer voltage $V_x$ is applied to diodes D by means of these resistors. The diodes D are biased in the blocking direction via series resistors $R_v$ so that in the embodiment considered $V_{v1}$ is smaller than zero and $V_{v2}$ is smaller than zero. Thus, the positions of break points $P_{k1}$ and $P_{k2}$ of the diode characteristic curves are determined. These series resistors are connected to first electrodes of the diodes D. The second electrodes of diodes D are connected to current dividers Q which may be used to select the slope $S_k$ of the voltage and current characteristics. The currents from the individual diode sections are added together at an adding point S and this is provided by connecting the current dividers Q together. The point S is the input of an adder amplifier A, and the multi-rectilinear characteristic $-f_a(V_x)$ appears at the output thereof.

As has been mentioned above, this is a type of circuit which is used in the prior art, and which is subject to the disadvantage that the temperature effect causes a great shift of the break points of the respective rectilinear curves, and, therefore, a sufficiently precise approximation of the desired function cannot be obtained.

Figure 4:
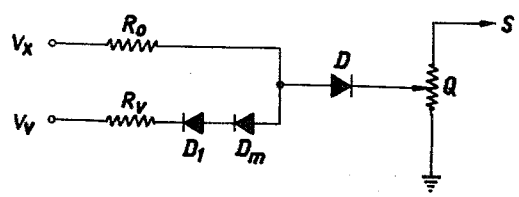
FIGURE 4 is a circuit diagram of the temperature compensating function generator of the present invention.

Accordingly, the circuit illustrated in FIGURE 4, which is that of the present invention, is provided. In FIGURE 4, the portion of the function generator illustrated in FIGURE 3 is provided. Compensation semiconductor diodes $D_1 \ldots D_m$ are connected in series with the series resistor $R_v$ and are connected to be biased in the forward direction.

The number $m$ of compensation diodes which are required may be determined from the formula $$m = \frac{R_o + R_v}{R_o}$$

where $m$ is the number of compensation diodes,
$R_o$ is the linearizing resistance, and
$R_v$ is the series resistance.

This equation is applicable when the prerequisite is satisfied that the compensation diodes have substantially the same properties as the diode D. The values of resistors $R_o$ and $R_v$ must be so provided that in the formula mentioned above an integral quotient will be provided, that is, that $R_o$ can be divided into $R_o + R_v$ a number of times which is an integer.

Figure 5:
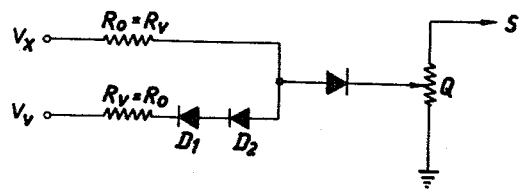
FIGURE 5 is a circuit diagram of a special type of temperature compensating function generator which is somewhat different than the embodiment of FIGURE 4.

In a modification thereof, as illustrated in FIGURE 5, the resistance values of the series resistor $R_v$ and a linearizing resistor $R_o$ are equal and therefore a minimum number of compensation diodes is needed, which according to the above-mentioned equation is 2.

It will be understood that the above description of the present invention is susceptible to various modifications, changes, and adaptations, and the same are intended to be comprehended within the meaning and range of equivalents of the appended claims.

What is claimed is:

1. In an arrangement for the temperature compensation of a semiconductor diode function generator for analog computers, wherein the function generator includes a first semiconductor diode arranged to be reverse biased by a voltage via a series resistor, and a linearizing resistor connected to the first diode by means of which a voltage from such computer may be applied to the diode, the improvement comprising: a plurality of other semiconductor diodes connected in series with said series resistor and arranged to be biased in their forward direction, the number of said other diodes being dependent upon the resistance values of said series resistor and said linearizing resistor.

2. A combination as defined in claim 1, wherein said other semiconductor diodes are provided with substantially the same properties as said semiconductor diode, and the number of said other diodes being equal to $$\frac{R_o + R_v}{R_o}$$

where $R_o$ is the value of the series resistor and $R_v$ is the value of the linearizing resistor.

3. A temperature compensation semiconductor diode function generator circuit for analog computers, comprising, in combination:
   (a) a main semiconductor diode;
   (b) a series resistor connected to said semiconductor diode and via which a voltage is applied to bias it in the blocking direction;
   (c) a linearizing resistor connected to said diode and arranged for applying a voltage from said computer thereto by means of said linearizing resistor; and
   (d) a plurality of temperature compensation semiconductor diodes in series with said series resistor and connected in their forward direction, the number of said diodes being dependent upon the resistance values of said series resistor and said linearizing resistor.

4. A circuit as defined in claim 3, wherein said compensation semiconductor diodes have substantially the same properties as said main semiconductor diode, the number of compensation semiconductor diodes being equal to $$\frac{R_o + R_v}{R_o}$$

where $R_o$ is the series resistor value and $R_v$ is the linearizing resistor value.

5. In a function generator of a computer, the improvement comprising:
   (a) a main semiconductor diode having its cathode connected to a first conductor and its anode connected to a second conductor; and
   (b) resistor circuit means connected to said second conductor and in series with said main semiconductor diode and including
      (1) a linearizing resistance connected to said second conductor for applying thereto a voltage from the computer, and
      (2) a plurality of temperature compensation diodes connected in series with their respective anodes connected to be closer to said second conductor than their respective cathodes, the last of said compensation diodes having its anode connected to said second conductor and a series resistance connected with the cathode of the first of said compensation diodes.

References Cited in the file of this patent

UNITED STATES PATENTS

| | | |
|---|---|---|
| 2,697,201 | Harder | Dec. 14, 1954 |
| 2,927,223 | Meirowitz | Mar. 1, 1960 |
| 3,005,918 | Judkins | Oct. 24, 1961 |